(12) United States Patent
Tokuyama

(10) Patent No.: US 7,889,619 B2
(45) Date of Patent: Feb. 15, 2011

(54) HOLOGRAM RECORDING/REPRODUCING APPARATUS AND LIGHT SOURCE APPARATUS

(75) Inventor: Kazutatsu Tokuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 12/142,308

(22) Filed: Jun. 19, 2008

(65) Prior Publication Data

US 2009/0040903 A1 Feb. 12, 2009

(30) Foreign Application Priority Data

Aug. 10, 2007 (JP) ............................. 2007-209673

(51) Int. Cl.
*G11B 7/00* (2006.01)
(52) U.S. Cl. ..................... 369/112.16; 369/112.15; 369/103
(58) Field of Classification Search ............. 369/103, 369/112.15, 112.16
See application file for complete search history.

(56) References Cited

U.S. PATENT DOCUMENTS

| | | | | |
|---|---|---|---|---|
| 2004/0042374 A1* | 3/2004 | Horimai | ........................ | 369/103 |
| 2006/0126141 A1* | 6/2006 | Hirao et al. | ...................... | 359/3 |
| 2006/0232841 A1* | 10/2006 | Toishi et al. | .................... | 359/24 |
| 2007/0103750 A1* | 5/2007 | Horimai | ........................ | 359/22 |
| 2008/0037088 A1* | 2/2008 | Sako et al. | ...................... | 359/35 |
| 2008/0088898 A1* | 4/2008 | Szarvas et al. | ................ | 359/24 |

FOREIGN PATENT DOCUMENTS

| | | |
|---|---|---|
| JP | 5-206580 | 8/1993 |
| JP | 11-242424 | 9/1999 |

OTHER PUBLICATIONS

H. Horimai, et al., "Holographic Medium ready for taking off, turning 200 gigabytes storage capacity into reality in 2006", Nikkei Electronics, 2005, pp. 105-114, (with English translation).

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

A hologram recording/reproducing apparatus records data as a hologram by applying signal and reference light beams to a hologram-recording medium, obtains a diffracted light beam by applying a reproduction light beam to the hologram, and reproduces the data using the diffracted light beam. The hologram recording/reproducing apparatus includes an external-cavity light source, a polarization-control element that changes a polarization angle of a light beam emitted from the external-cavity light source, a polarizing-beam-splitting element that splits the light beam to obtain two light beams and that changes a ratio between amounts of the two light beams, a photoreceptor that receives one of the two light beams, a spatial light modulator that receives the other beam and that generates signal, reference, and reproduction light beams, and a control unit that changes the polarization angle or polarization state of the light beam.

6 Claims, 9 Drawing Sheets

HOLOGRAM RECORDING/REPRODUCING APPARATUS AND LIGHT SOURCE APPARATUS

CROSS REFERENCES TO RELATED APPLICATIONS

The present invention contains subject matter related to Japanese Patent Application JP 2007-209673 filed in the Japanese Patent Office on Aug. 10, 2007, the entire contents of which are incorporated herein by reference.

BACKGROUND OF THE INVENTION

1. Field of the Invention

The present invention relates to hologram recording/reproducing apparatuses and light source apparatuses.

2. Description of the Related Art

Recently, a hologram memory has drawn attention as a data-storage device. In the hologram memory, a recording operation is performed using a hologram recording apparatus, and a reproducing operation is performed using a hologram reproducing apparatus. The recording operation is performed as follows: A signal light beam that has been modulated on the basis of data to be recorded and a predetermined reference light beam are generated using laser light emitted from the same light source; and The signal and reference light beams are applied to a hologram-recording medium, and are caused to interfere with each other in the hologram-recording medium to form interference fringes (a hologram). In this manner, data is recorded in the hologram-recording medium as the hologram. In the hologram that is recorded, an extremely large amount of information is included in units of one page. The recorded data is specified and managed in units of one page.

Additionally, in the hologram memory, the recorded data is reproduced from the hologram-recording medium, in which the data is recorded, using the hologram reproducing apparatus. The reproducing operation is performed as follows. A reproduction light beam having characteristics similar to those of the reference light beam that is used in the recording operation is applied to the hologram, which is formed on the basis of the recorded data, whereby a diffracted light beam is generated by the hologram-recording medium. Information expressed by the diffracted light beam corresponds to the recorded data included in one page. Accordingly, the diffracted light beam is received by photoreceptors that are two-dimensionally disposed, and signal processing is performed to reproduce the recorded data.

Furthermore, a hologram recording/reproducing apparatus has been suggested, in which a function of the hologram recording apparatus and a function of the hologram reproducing apparatus are realized in the same apparatus.

The generation of the signal, reference, reproduction light beams and the reception of the diffracted light beam, which are described above, are performed in an optical unit of the hologram recording/reproducing apparatus, and the optical unit is configured using a combination of optical components. As one system for designing an optical path in the optical unit, a so-called coaxial system (for example, see pages 106 to 114 of the Jan. 17, 2005 issue of Nikkei Electronics) is known, in which the signal and reference light beams are coaxially applied, in which the path of the reference light beam is the same as that of the reproduction light beam, and in which the light beams (the signal, reference, reproduction light beams) have a common optical path in which the light beams pass. As another system for designing an optical path in the optical unit, a two-beam system is known, in which the signal light beam and the reference (reproduction) light beam pass in different optical paths.

When the hologram is recorded and reproduced, a system is used, in which the light beam emitted from the single light source is split into the reference and signal light beams, and in which the interference fringes formed by the reference and signal light beams are recorded. Accordingly, as the light source, a coherent single-mode laser light source is necessary. As light sources including the above-described light source, some laser sources such as solid laser sources using yttrium aluminum garnet (YAG) crystals or the like or light sources using semiconductor lasers have been considered. From among the laser sources, external-cavity-type single-mode light sources (hereinafter, referred to as "external-cavity light sources") using semiconductor lasers have been suggested as blue lasers (having a wavelength of 400 nm). As typical examples of the external-cavity light sources, external-cavity light sources of Littrow type and Littman type have been known. Japanese Unexamined Patent Application Publication No. 5-206580 discloses an external-cavity-type light source, and Japanese Unexamined Patent Application Publication No. 11-242424 discloses a system and method for a holographic storage device using a holographic optical element.

SUMMARY OF THE INVENTION

In optical disks in the related art, a stabilization system of the beam power of a light beam (hereinafter, referred to as an "automatic phase control (APC) system") is used, in which the beam power of the light beam is stabilized by controlling an injection current that is injected into a semiconductor laser. However, in the above-described external-cavity light sources, it is difficult to use the APC system. In other words, in a case in which the intensity of the beam power of the light beam is changed by controlling the injection current that is injected into the semiconductor laser, the intensity of the beam power of a light beam emitted from an external-cavity light source is simultaneously changed. Additionally, mode hoping also occurs in some cases. The occurrence of the mode hoping influences the stabilization of the laser light in the single mode. However, in reality, a technique for accurately controlling the beam power of the light beam emitted from the external-cavity light source has been demanded. For example, when hologram-recording layers whose light-receiving sensitivity is largely changed in accordance with temperature change of a hologram-recording medium, a technique is necessary, in which the beam power of a light beam is changed, i.e., in which the intensity of a light beam is changed in accordance with the characteristics of the hologram-recording layers and is accurately stabilized.

If such a technique for freely changing and accurately stabilizing the beam power of the light beam obtained by the external-cavity light source is provided, it is expected that a range of the industrial application of the external-cavity light source will largely extend. However, a technique that is related to an external-cavity light source capable of changing the beam power of a light beam has not been provided. It is desirable to provide a technique for changing and accurately stabilizing the beam power of a light beam obtained by an external-cavity light source. It is also desirable to provide a technique for changing and accurately stabilizing the beam power of a light beam in a hologram recording/reproducing apparatus using an external-cavity light source.

According to an embodiment of the present invention, there is provided a hologram recording/reproducing apparatus that records data as a hologram by applying a signal light beam and a reference light beam to a hologram-recording medium, that obtains a diffracted light beam by applying a reproduction light beam to the hologram recorded in the hologram-recording medium, and that reproduces the recorded data using the diffracted light beam. The hologram recording/reproducing apparatus includes the following elements: an external-cavity light source; a polarization-control element configured to change a polarization angle or polarization state of a light beam emitted from the external-cavity light source; a polarizing-beam-splitting element configured to split the light beam polarized by the polarization-control element in two directions to obtain two light beams, and configured to change a ratio between amounts of the two light beams on the basis of the polarization angle of the light beam that is determined by the polarization-control element or on the basis of the polarization state of the light beam that is determined by the polarization-control element; a photoreceptor configured to receive one of the two light beams obtained by splitting the light beam in the two directions; a spatial light modulator configured to receive the other of the two light beams obtained by splitting the light beam in the two directions, and configured to generate a signal light beam, a reference light beam, and a reproduction light beam; and a control unit configured to perform a control operation of changing, on the basis of a light amount detected by the photoreceptor, the polarization angle or polarization state of the light beam that is determined by the polarization-control element.

In the hologram recording/reproducing apparatus according to the embodiment of the present invention, the external-cavity light source emits a light beam. The polarization-control element changes the polarization angle or polarization state of the light beam emitted from the external-cavity light source. The polarizing-beam-splitting element splits the light beam polarized by the polarization-control element in two directions to obtain two light beams, and changes the ratio between amounts of the two light beams on the basis of the polarization angle or polarization state of the light beam that is determined by the polarization-control element. One of the two light beams obtained by splitting the light beam in the two directions is received by the photoreceptor. The other of the two light beams is received by the spatial light modulator. The spatial light modulator, which has received the light beam, generates a signal light beam, a reference light beam, and a reproduction light beam. The control unit performs the control operation of changing, on the basis of the light amount detected by the photoreceptor, the polarization angle or polarization state of the light beam that is determined by the polarization-control element. In this manner, the amount of the light beam incident on the spatial light modulator can be stably and accurately controlled. Furthermore, the amounts of the signal, reference, reproduction light beams incident on the hologram-recoding medium can be also stably and accurately controlled.

According to an embodiment of the present invention, there is provided a light source including an external-cavity light source, a polarization-control element configured to change a polarization angle or polarization state of a light beam emitted from the external-cavity light source, a polarizing-beam-splitting element configured to split the light beam polarized by the polarization-control element in two directions to obtain two light beams, and configured to change a ratio between amounts of the two light beams on the basis of the polarization angle of the light beam that is determined by the polarization-control element or on the basis of a polarization state of the light beam that is determined by the polarization-control element, a photoreceptor configured to receive one of the two light beams obtained by splitting the light beam in the two directions, and a control unit configured to perform a control operation of changing, on the basis of a light amount detected by the photoreceptor, the polarization angle or polarization state of the light beam that is determined by the polarization-control element.

In the light source according to the embodiment of the present invention, the external-cavity light source emits a light beam. The polarization-control element changes the polarization angle or polarization state of the light beam emitted from the external-cavity light source. The polarizing-beam-splitting element splits the light beam polarized by the polarization-control element in two directions to obtain two light beams, and changes the ratio between amounts of the two light beams on the basis of the polarization angle or polarization state of the light beam that is determined by the polarization-control element. One of the two light beams obtained by splitting the light beam in the two directions is received by the photoreceptor. The control unit performs the control operation of changing, on the basis of the light amount detected by the photoreceptor, the polarization angle or polarization state of the light beam that is determined by the polarization-control element. In this manner, the amount of the light beam that has been split by the polarizing-beam-splitting element can be stably and accurately controlled.

According to the embodiments of the present invention, there is provided a technique for accurately stabilizing the beam power of a light beam obtained by an external-cavity light source. There is also provided a technique for accurately stabilizing the beam power of a light beam in a hologram recording/reproducing apparatus using an external-cavity light source.

DESCRIPTION OF THE PREFERRED EMBODIMENTS

Hologram Recording/Reproducing Apparatus According to Embodiments

Figure 1:
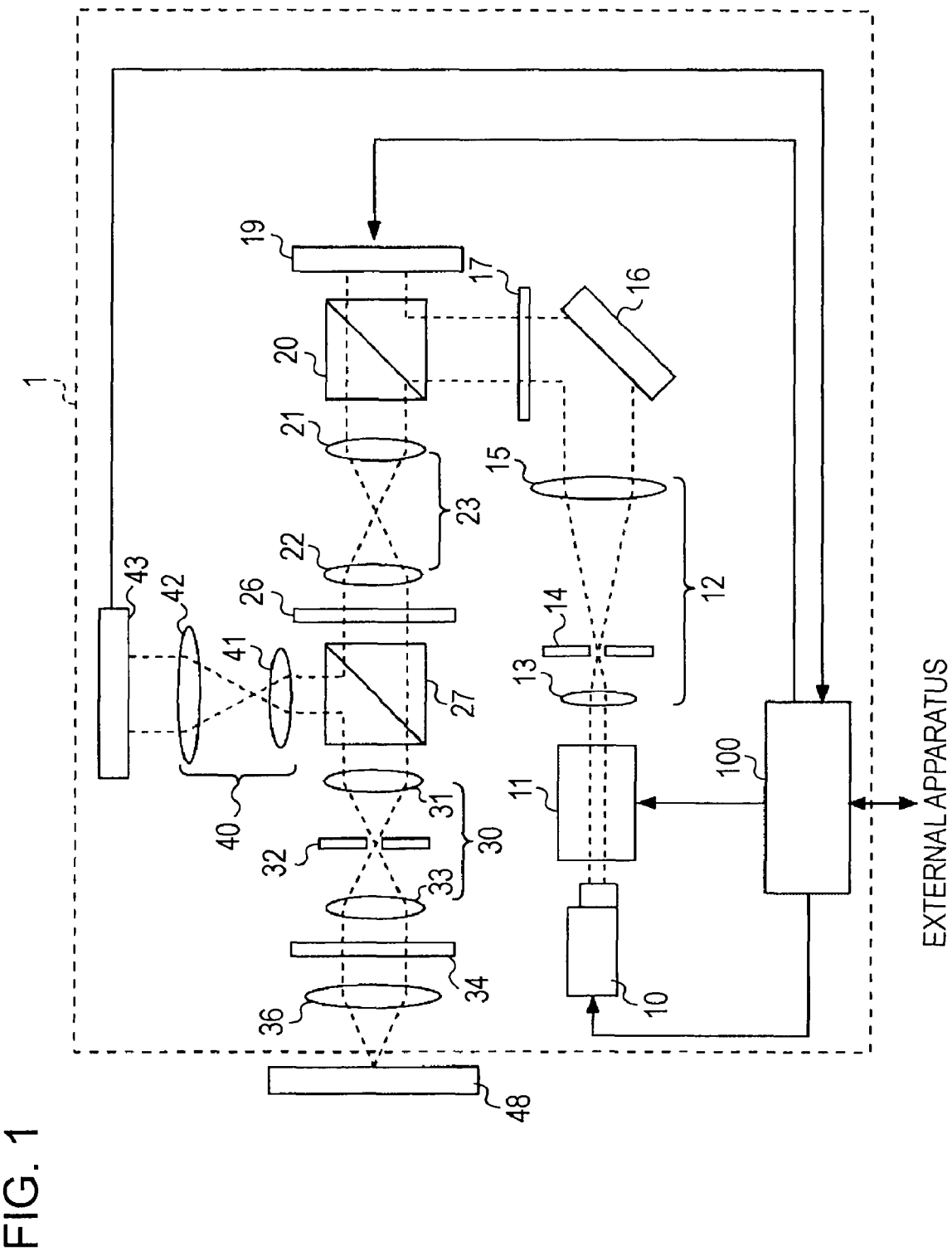
FIG. 1 is a schematic diagram of a hologram recording/reproducing apparatus in which an optical unit thereof serves as the center of the apparatus.

FIG. 1 is a schematic diagram of a hologram recording/reproducing apparatus in which recording and reproducing of a hologram is performed using a hologram-recording medium while an optical unit that is a main unit of the hologram recording/reproducing apparatus serves as the center of the apparatus. The hologram recording/reproducing apparatus shown in FIG. 1 is an apparatus that records and reproduces a hologram, and employs a coaxial system. There are two types of hologram-recording mediums used in coaxial-optical systems, namely, a transmission type and a reflection type. FIG. 1 is a schematic diagram showing a coaxial-optical system in which a reflection-type hologram-recording medium is used.

A hologram recording/reproducing apparatus 1 shown in FIG. 1 includes the optical unit as a main component. The hologram recording/reproducing apparatus also includes a control unit 100 having electric circuits whose details are not illustrated, and further includes mechanism units that are not illustrated. The hologram recording/reproducing apparatus 1 is connected to external apparatuses that are not illustrated via the control unit 100. The external apparatuses may be, for example, a host computer, an image display apparatus (a monitor), and so forth. The hologram recording/reproducing apparatus 1 can record a hologram in a hologram-recording medium 48 having hologram-recording layers, and read recorded information from the hologram.

In the optical unit of the hologram recording/reproducing apparatus 1, an optical path in which a light beam passes is formed. The optical unit includes the following elements: an external-cavity light source such as an external-cavity laser diode (ECLD) having a laser light source; an isolator/shutter 11; a beam expander/pinhole 12 having a Fourier transform lens 13, a pinhole 14, and a Fourier transform lens 15; a mirror 16; a half wave plate (HWP) 17; a spatial light modulator (SLM) 19; a polarizing beam splitter 20 that functions as a polarizing-beam-splitting element; a relay lens 23 having a Fourier transform lenses 21 and 22; a phase mask 26; a polarizing beam splitter (PBS) 27; a Fourier transform lens 31; an aperture 32; a Fourier transform lens 33; a polarizing-beam-diffracting (PBD) element 34; an objective lens 36; a beam expander 40 having a Fourier transform lenses 41 and 42, and an image sensor 43.

The hologram-recording medium 48, which is used in the hologram recording/reproducing apparatus 1 shown in FIG. 1, has a disk shape similar to that of a compact disk (CD) or a digital versatile disk (DVD). At the most inner track of the hologram-recording medium 48, a hole portion used to position the rotation center is provided. As the mechanism units that are not shown in FIG. 1, the hologram-recording medium 48 includes a mechanism unit that causes the hologram-recording medium 48 to rotate, and a mechanism unit that serves as a focus servomechanism and as a tracking servomechanism. The mechanism units are controlled by the control unit 100.

Outline Description of Recording Operation

In the hologram recording/reproducing apparatus 1 shown in FIG. 1, a recording operation is performed as follows. First, when the recording operation is performed, the external-cavity light source 10, which is a light source of an external cavity type, produces laser light by oscillation. The control unit 100 sets a condition so that a longitudinal mode that is an oscillation mode of the laser can exist as a single mode. The control unit 100 also sets an injection current so that the amount of an emitted light beam can be made sufficient for recording of signals in a hologram-recording medium. With the settings, the control unit 100 controls the external-cavity light source 10 to emit laser light. A light beam emitted from the external-cavity light source 10 passes through the isolator/shutter 11, which includes an isolator (for example, a Faraday rotator that is commercially available) that prevents a feedback light beam generated at further-downstream components of the following optical system from returning to the external-cavity light source 10 as much as possible, and a shutter that adjusts an exposure time. After that, the light beam passes through the beam expander/pinhole 12. The beam expander/pinhole 12 includes a beam expander having the Fourier transform lenses 13 and 15 that expand the light beam so that the light beam can have a beam diameter necessary for modulation of a reference light beam and a signal light beam. In the beam expander/pinhole 12, the pinhole (a spatial filter) 14 is disposed at a focus position of the lenses of the beam expander to smooth an intensity distribution of the light beam.

The light beam that is expanded by the beam expander so as to have a desired diameter is reflected by the mirror 16, and passes through the half wave plate 17. The light beam enters the polarizing beam splitter 20, and then, each of s-polarized light and p-polarized light either passes through or is reflected by the polarizing beam splitter 20. In the below description, suppose that s-polarized light is reflected by the polarizing beam splitter 20 toward the spatial light modulator 19, and p-polarized light passes though the polarizing beam splitter 20. In this case, the rotation angle of the half wave plate 17 is adjusted, whereby the half wave plate 17 functions as a polarization-control element to adjust a direction of a linearly polarized light beam that enters the polarizing beam splitter 20. In other words, the amplitude of each of the s-polarized and p-polarized light that enter the polarizing beam splitter 20 can be changed. The amount of a light beam incident on the spatial light modulator 19 can be adjusted by rotating the half wave plate 17.

Figure 2B:
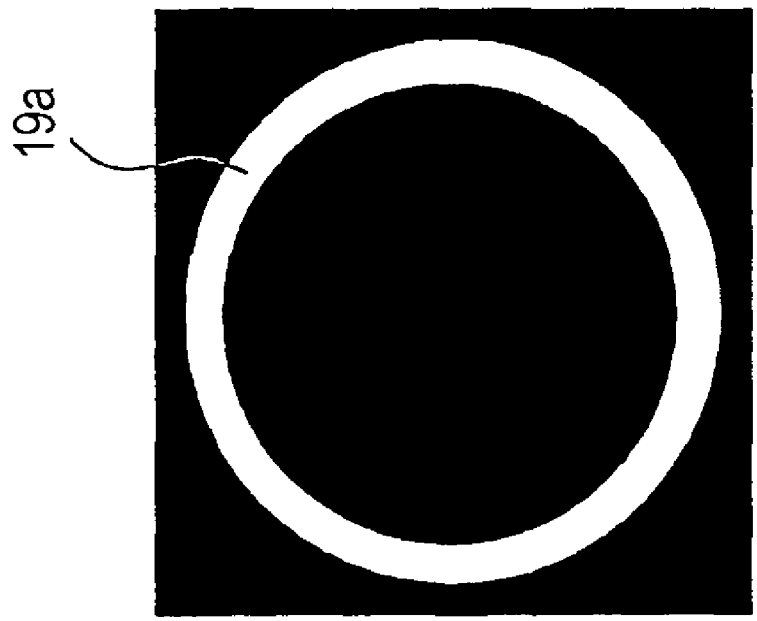
FIG. 2A and FIG. 2B are diagrams showing patterns each of which is displayed in a reference-light-beam region or signal-light-beam region.
Figure 2A:
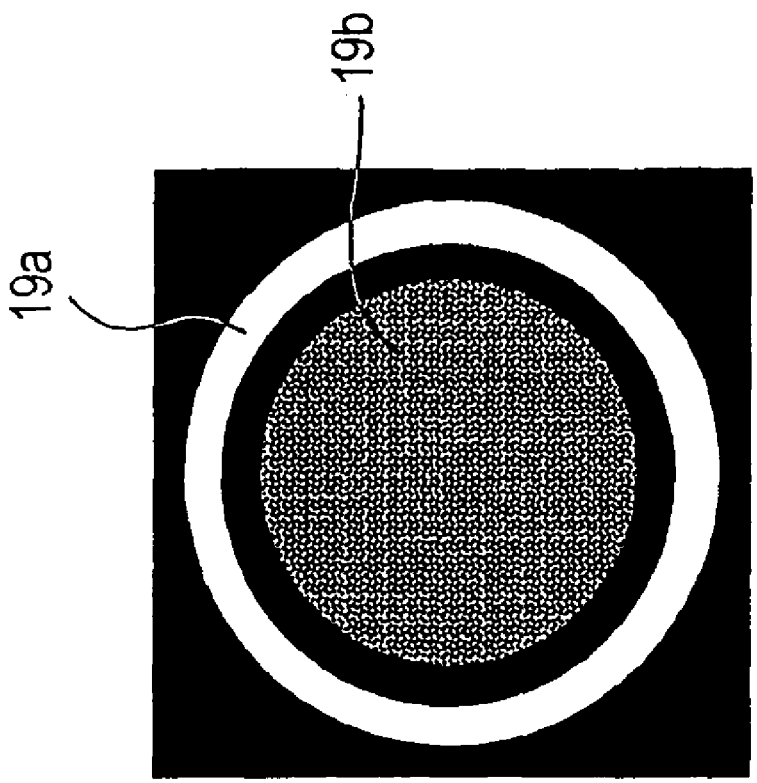

As the spatial light modulator 19, a device capable of controlling polarization, such as a reflective liquid crystal device that is used for display purposes, is used. FIG. 2A is a diagram showing a pattern (a ring pattern) that is displayed in a reference-light-beam region 19a of the spatial light modulator 19 and a pattern (a circular pattern) that is displayed in a signal-light-beam region 19b when the recording operation is performed. The control unit 100 controls individual pixels formed on the spatial light modulator 19 to obtain the patterns that are displayed in the corresponding regions.

Images of the reference and signal light beams are generated by modulating a light beam in the reference-light-beam region 19a and the signal-light-beam region 19b. In order to transfer the images of the reference and signal light beams to the recording medium 48, it is necessary to switch the light beam incident on the spatial light modulator 19 from being s-polarized light to being p-polarized light. In this case, modulation in which the polarization direction of the incident light beam is changed so that the incident light beam can change from being s-polarized light to being p-polarized light is defined as "1" modulation. In contrast, modulation in which the polarization direction of the incident light beam is not changed and the incident light beam remains as s-polarized light is defined as "0" modulation. The below description will be made using the definitions given above. The "1" modulation is performed on an incident light beam for pixels of the spatial light modulator 19 corresponding to an image to be transferred to the hologram-recording medium 48. The modulated light beam passes through the polarizing beam splitter 20, and proceeds to the relay lens 23. The "0" modulation is performed on an incident light beam for pixels that do not correspond to the image to be transferred to the hologram-recording medium 48. The light beam that remains as s-polarized light is reflected by the polarizing beam splitter 20, and terminates in the isolator/shutter 11 disposed in front of the external-cavity light source 10.

The light beam on which desired modulation has been performed passes through the relay lens 23 to generate a real image. When the light beam is condensed in the hologram-recording layers of the hologram-recording medium 48, it is necessary that concentration of a direct-current (DC) element on a Fourier plane be suppressed. In order to suppress the concentration, the phase mask 26 is disposed to arbitrarily provide a phase difference of zero or $\pi$ to units of pixels for the image that can be obtained on a real-image plane. Phase modulation is performed by the phase mask 26 on the image to be recorded. Then, the light beam passes through the polarizing beam splitter 27, and the signal bandwidth of the light beam is optimized by the aperture 32 that is disposed at a focus position of a relay lens 30 including the Fourier transform lenses 31 and 33. The signal bandwidth that is set using the aperture 32 influences a signal bandwidth in a case in which the recording operation is performed, and a setting for oversampling in a case in which a reproducing operation is performed. In this case, in order to satisfy the Nyquist criterion, the signal bandwidth is set so as to have a width twice a Nyquist frequency on the Fourier plane.

The light beam passes through the relay lens 30, and then passes through the polarizing-beam-diffracting element 34. The polarizing-beam-diffracting element 34 is configured as a device including a quarter wave plate (QWP) and liquid-crystal diffraction elements that perform a function on the reference light beam. As the main function, the polarizing-beam-diffracting element 34 suppresses unnecessary light (an optical noise component) derived from the reference light beam in a case in which the reproducing operation is performed. Detailed description of the polarizing-beam-diffracting element 34 is made below. The light beam passes through the polarizing-beam-diffracting element 34, whereby the light beam that is to enter the objective lens 36 as p-polarized light is circularly polarized. The light beam passes through the objective lens 36, and interference fringes formed by the reference and signal light beams are recorded in the hologram-recording layers of the hologram-recording medium 48 as a hologram. Up to this point, the function of each component in a case in which the recording operation is performed has been described.

Next, in contrast to the above-described case in which a hologram is recorded in the hologram-recording layers of the hologram-recording medium 48 using the above-described function of each component, a function of each component in a case in which the hologram is reproduced will be described. A process of the reproducing operation is the same as that of the recording operation that is performed until the light beam enters the spatial light modulator 19. FIG. 2B shows a pattern displayed on the spatial light modulator 19 in a case in which the reproducing operation is performed. As shown in FIG. 2B, only the reference-light beam region 19a having a ring shape is displayed on the spatial light modulator 19. Only the reference light beam passes through the relay lens 23, the phase mask 26, the polarizing beam splitter 27, the polarizing-beam-diffracting element 34, and the objective lens 36. Then, the light beam that is circularly polarized enters the hologram-recording layers of the hologram-recording medium 48. The interference fringes, which are recorded as the hologram, serve as a diffraction grating, whereby light diffraction occurs so that a diffracted light beam is obtained on the basis of a pattern displayed in the signal-light-beam region 19b.

Generally, the diffraction efficiency of a reflected diffracted light beam ranges from a few percent to less than one percent, in contrast to that of the reference light beam. Accordingly, when the diffracted light beam is detected, a reference light beam that is reflected by the hologram-recording medium 48 is undesired light, i.e., optical noise. Propagation of this reference light beam that is reflected by the hologram-recording medium 48 is suppressed by the polarizing-beam-diffracting element 34. The liquid-crystal diffraction elements, which are included in the polarizing-beam-diffracting element 34 that performs a function on the reference light beam, are disposed in a region corresponding to the reference-light beam region 19a. The liquid-crystal diffraction elements are designed so that p-polarized light can pass through the liquid-crystal diffraction elements and so that s-polarized light can be diffracted by the liquid-crystal diffraction elements. Accordingly, the reference light beam that is circularly polarized is reflected by the hologram-recording medium 48. After that, the reference light beam is s-polarized by the quarter wave plate included in the polarizing-beam-diffracting element 34, and is diffracted by the liquid-crystal diffraction elements.

The diffracted light beam that is s-polarized by the polarizing-beam-diffracting element 34 passes through the relay lens 30. Then, the diffracted light beam is led by the polarizing beam splitter 27 to the beam expander 40, and is applied to the image sensor 43. In the image sensor 43, generally, image-pickup elements, such as charge-coupled element (CCD) image sensors or complementary metal-oxide-semiconductor (CMOS) image sensors, and a camera module in which the image-pickup elements are mounted are used. In this case, in order that a diffracted light beam corresponding to a signal of one pixel unit of the spatial light modulator 19 is obtained by the image sensor 43 in units of two×two pixels, the beam diameter of the diffracted light beam is expanded by the beam expander 40. In other words, the size of units for oversampling is set as two×two pixels. After the oversampling is performed, the diffracted light beam is detected by the image sensor 43, and signal processing is performed by the control unit 100 in units of images. Because the oversampling is performed, a shift of an optical alignment is acceptable within a certain range. However, when the size of units for the oversampling is set as 1.4×1.4 pixels, it is necessary to reduce the size of the aperture 32, which is disposed in the relay lens 30, in accordance with the size of units for the oversampling. In this case, the size reduction of the aperture 32 imposes a limitation on the signal bandwidth. Up to this point, the function of each component in a case in which the recording/reproducing operations are performed in a reflection-type coaxial system have been described.

Adjustment to Light Beam Emitted from External-Cavity Light Source

When focusing on a method for adjusting the beam power of a light beam emitted from an external-cavity light source in a case in which the recording/reproducing operations are performed, the present inventor described in the application of the present invention considered the following three methods:

1) Adjust the amount of an injection current that is to be injected into a laser diode (LD) which is an external-cavity light source;

2) Adjust timing at which a shutter is closed and opened, thereby adjusting an exposure time; and 3) Adjust rotation of a half wave plate, thereby adjusting the amount of a light beam incident on a spatial light modulator.

As a result of the consideration, the inventor reached the following conclusions for the above-mentioned methods 1), 2), and 3).

Regarding the method 1) for adjusting the amount of an injection current that is to be injected into a laser diode, an oscillation frequency in a longitudinal mode of a laser is adjusted by controlling the injection current, and the adjustment of the oscillation frequency is assigned top priority. For this reason, it is very difficult to adjust the beam power of an outgoing light beam by controlling the injection current. In other words, a range over which the beam power of the light beam (the beam power of the outgoing light beam) can be adjusted is limited by a range over which the longitudinal mode is stably performed. Additionally, a differential efficiency of the laser diode is fluctuated due to fluctuations in environmental temperature or the like. For this reason, it is difficult to set the oscillation frequency to a predetermined frequency while the beam power of the light beam is being maintained constant. In most cases, the beam power of the light beam changes over time.

Regarding the method 2) for adjusting an exposure time using a shutter, an effect the same as that obtained by controlling the beam power of the light beam can be obtained in some applications. In other words, in a case in which an instantaneous value of the beam power of the light beam is not important, and in which a time-integrated value of the beam power of the light beam in a certain period of time is important, by controlling a period of time for which the shutter is opened (by controlling the integral of the amount of the light beam), an effect the same as that obtained by controlling the beam power of the light beam can be obtained. For example, the method 2) can be an efficient method when the external-cavity light source is used in a hologram recording/reproducing apparatus. However, when the beam power of the light beam emitted from the external-cavity light source changes over time, there is a problem that the integral of the amount of a light beam incident on a hologram-recording medium is not stable.

Regarding the method 3) for adjusting the amount of a light beam incident on a spatial light modulator, the amount of the light beam incident on the spatial light modulator can be adjusting by adjusting the light-incident polarization angle of a light beam that enters a polarizing beam splitter. However, it is difficult to prevent the beam power of the light beam from changing over time.

None of the methods 1) to 3) is a method for realizing control and stabilization of the beam power of the light beam without being influenced by an environmental temperature. In most cases, hologram-recording layers of hologram-recording mediums are formed of photopolymer. In such cases, it is generally known that the recording sensitivity of photopolymer shows different characteristics for temperature. In other words, the recording/reproducing characteristics of the hologram-recording layers depend on temperature. Accordingly, it is necessary that the beam power of the light beam be stabilized as a desired light amount and be controlled without being influenced by the environmental temperature.

Techniques for Controlling Beam Power of Light Beam Emitted from External-Cavity Light Source According to Embodiments In order that the beam power of the light beam emitted from the external-cavity light source is stabilized as a predetermined beam power, as described above, when techniques described in the methods 1) to 3) are to be implemented, there are the technical problems described above. In the related art, in a recording/reproducing apparatus for an optical recording medium, such as a recording/reproducing apparatus for a DVD, a laser diode is mounted in an optical pick-up unit. Suppose that a photo diode (PD) is disposed at a position opposite to a plane, which the laser light leaves, of the laser diode, or disposed in an optical system of the optical pickup unit. When the laser diode emits laser light, a current value detected by the photo diode is acquired. In such a case, when the laser diode is the external-cavity light source, it is also difficult to perform stabilization of the beam power of the light beam by controlling an injection current to be injected into the laser diode. Accordingly, techniques for controlling the beam power of the light beam emitted from the external-cavity light source will be described below as first and second embodiments in which specific examples are given. In the first and second embodiments, a configuration of a polarization-control element will be mainly and specifically described.

First Embodiment

Figure 3:
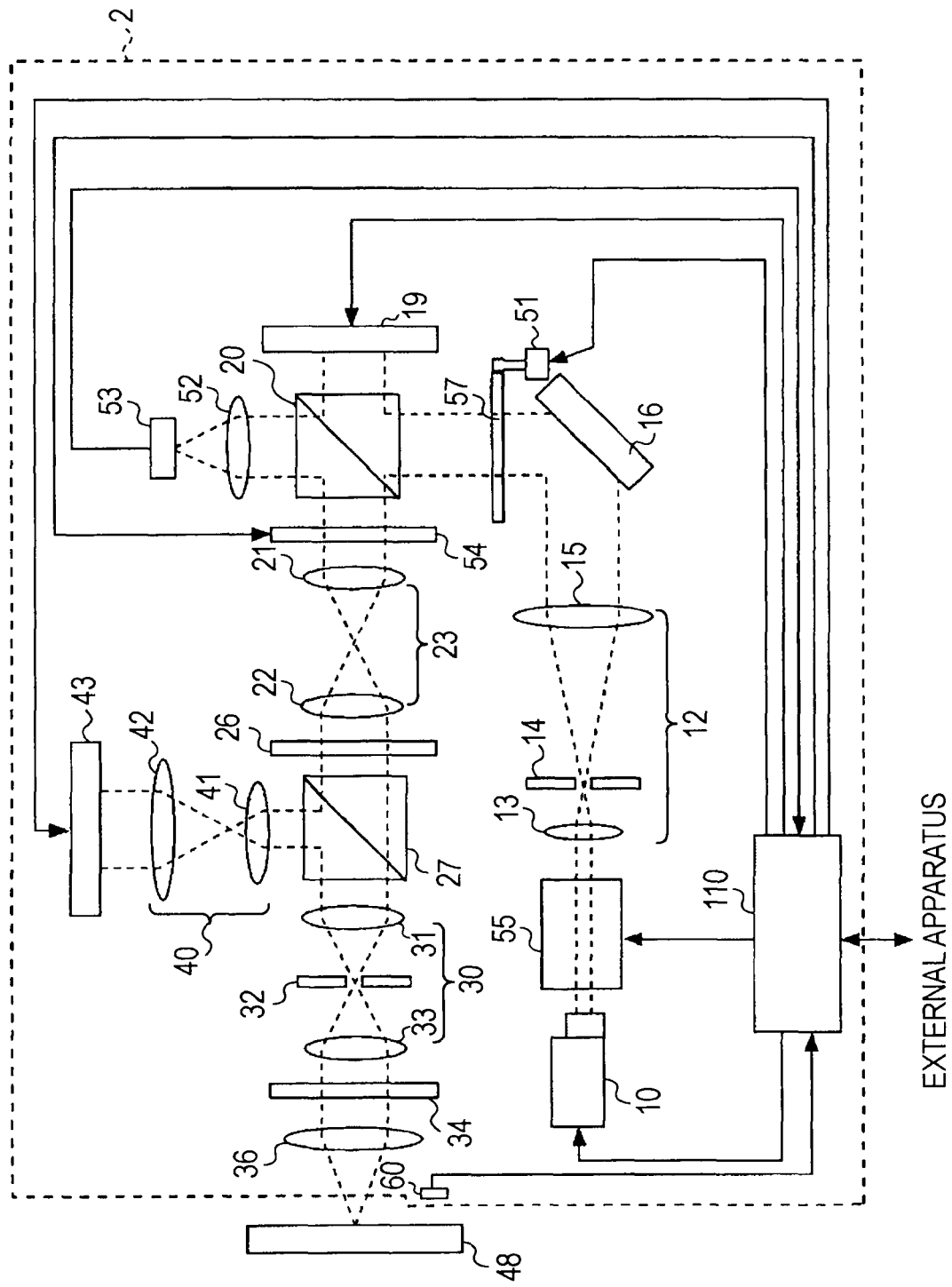
FIG. 3 is a schematic diagram of a hologram recording/reproducing apparatus according to a first embodiment.

FIG. 3 is a schematic diagram of a hologram recording/reproducing apparatus 2 according to a first embodiment, and the hologram recording/reproducing apparatus 2 has a function of stabilizing the beam power of a light beam emitted from an external-cavity light source as predetermined beam power, i.e., an APC function. As in the case of the hologram recording/reproducing apparatus 1 shown in FIG. 1, the hologram recording/reproducing apparatus 2 employs the coaxial optical system as an optical system. Regarding components of the hologram recording/reproducing apparatus 2 shown in FIG. 3, components identical with those of the hologram recording/reproducing apparatus 1 shown in FIG. 1 are designated by the same reference symbols, and the description thereof is omitted.

The hologram recording/reproducing apparatus 2 shown in FIG. 3 has the configuration of the hologram recording/reproducing apparatus 1 shown in FIG. 1, and further includes a motor 51 that rotates a half wave plate 57. In other words, a polarization-control element is configured using the half wave plate 57 and the motor 51. Additionally, the hologram recording/reproducing apparatus 2 includes a condenser lens 52, a photo detector 53, and a shutter 54. The motor 51 may be, for example, a stepping motor having a hollow body. The condenser lens 52 condenses a light beam into the photo detector 53. In a case in which a photoreceptor diameter and photoreceptor sensitivity of the photo detector 53 are sufficiently large, and in which conditions for preventing the light beam from falling outside the photo detector 53 are satisfied, the above-mentioned unit configured to condense the light beam using the condenser lens 52 is not necessary. Furthermore, although the following components are also used in the hologram recording/reproducing apparatus 1, some modifications are made to the components in the hologram recording/reproducing apparatus 2. Instead of the isolator/shutter 11, an isolator 55 having only a function of serving as an isolator is used. Instead of the half wave plate 17, the half wave plate 57 is used, to which a rotation mechanism, such as a gear wheel, is added so that the half wave plate 57 can rotate using the motor 51. Instead of the control unit 100, a control unit 110 that exercises the APC function is used.

In the hologram recording/reproducing apparatus 2, in order to separate the functions of the shutter 54 and the isolator 55 from each other, the shutter 54 is disposed more behind optical components associated with the APC function in an optical path in a direction in which a light beam travels. In order to implement the APC function using low-speed processing, this disposition is used. When the isolator/shutter 11 is employed as in the hologram recording/reproducing apparatus 1, high-speed processing is necessary in order to exercise the APC function. The reason for this is that it is necessary to perform APC processing in consideration of a pulse operation of an outgoing light beam that leaves the shutter configured as the isolator/shutter 11, which is an operation caused by opening and closing of the shutter. More specifically, different exposure times (times for which the shutter is in an opening state) can be set depending on the beam power of a light beam, the medium sensitivity of a hologram-recording medium, and a desired data transfer rate of the recording/reproducing operations. When an exposure time in units of milliseconds is desired, it is necessary that the APC processing in which the APC function is exercised be processed in synchronism with the opening and closing of the shutter. Additionally, in this case, it is also necessary to use a device having an excellent frequency response as a device (a polarization-control element) that controls polarization.

In contrast, when a configuration such as the configuration of the hologram recording/reproducing apparatus 2, in which the shutter 54 is disposed between the polarizing beam splitter 20 and the relay lens 23, the function of setting an exposure time of a light beam for the hologram-recording medium and the APC function can be separated from each other. Accordingly, the above-mentioned problem does not occur. For components associated with the APC, it is only necessary that slow fluctuations such as fluctuations caused by temperature be managed. For example, a DVD optical disk apparatus in the related art includes an optical pickup unit used only for reproducing data, and, in the optical pickup unit, a component associated with the APC processing (an APC processing unit) is used. As in the case of the component associated with the APC processing in the related art, a bandwidth necessary for the APC processing can be designed as a bandwidth of the order of a few Hz. Thus, the APC function can be implemented using the bandwidth of the order of a few Hz.

Figure 4:
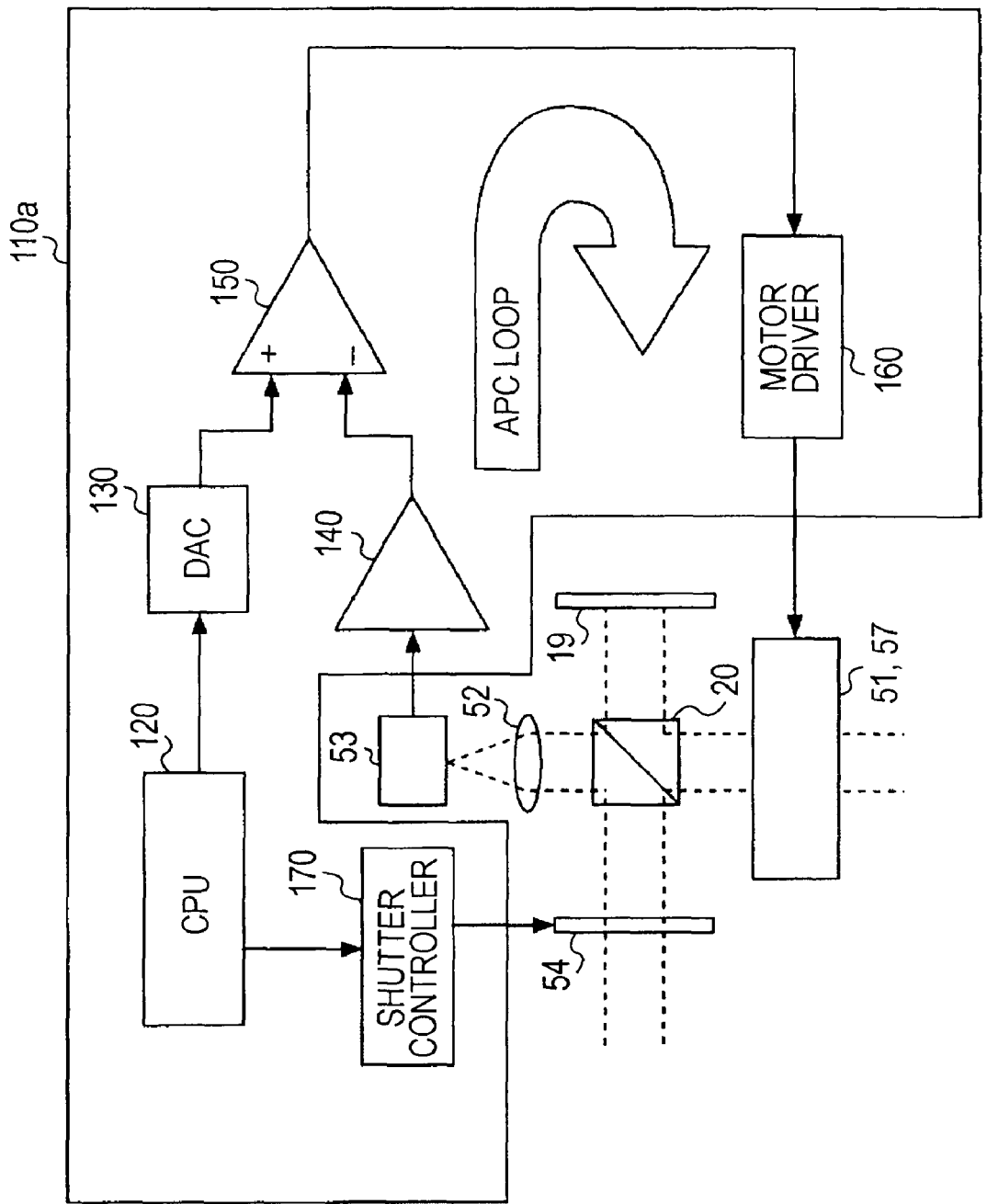
FIG. 4 is a schematic diagram of an APC processing unit according to the first embodiment.

FIG. 4 is a schematic diagram of an APC processing unit according to the first embodiment. Referring to FIG. 4, regarding the control unit 110, only a control unit 110a is shown as a component associated with the APC processing. Also regarding optical components, only components associated with the APC processing are shown.

The APC processing unit is described with reference to FIG. 4. The APC processing unit includes the half wave plate (HWP) 57, the polarizing beam splitter (PBS) 20, the condenser lens 52, and the photo detector (PD) 53 as optical components. Additionally, the APC processing unit includes the motor 51 as a mechanism component. As described above, a polarization-control element is configured using the half wave plate 57 and the motor 51. As the motor 51, a stepping motor is employed. The stepping motor is capable of performing accurate positioning using feedforward control. In this respect, the stepping motor is suitable for use in the hologram recording/reproducing apparatus 2 according to the first embodiment. However, a combination of a position sensor that detects a rotation position and a direct-current motor can function as in the case of the stepping motor. The APC processing unit includes the control unit 110a as one portion of the control unit 110. The control unit 110a includes a central processing unit (CPU) 120, a digital-to-analog converter (DAC) 130, a current-to-voltage converter (I-V) 140, a differential amplifier 150, and a motor driver 160 and a shutter controller 170 that function as power amplifiers.

A current proportional to the amount of a light beam that enters the photo detector 53 is obtained by the photo detector 53. A voltage proportional to the current is obtained by the current-to-voltage converter 140, and is input to one of two input terminals of the differential amplifier 150. In contrast, a digital signal output from the central processing unit 120 is converted into an analog signal by the digital-to-analog converter 130. The analog signal is input to the other input terminal of the differential amplifier 150 as a reference voltage. An error signal is obtained from the output terminal of the differential amplifier 150, and is input to the motor driver 160. Power is amplified by the motor driver 160, and the amplified power is applied to the motor 51. The photo detector 53, the current-to-voltage converter 140, the differential amplifier 150, the motor driver 160, the motor 51, the half wave plate 57, the polarizing beam splitter 20, and the condenser lens 52 form a closed loop (an APC loop), and the closed loop is configured as a negative feedback loop. In the negative feedback loop, a control operation is performed, in which the reference voltage, which is input to one input terminal of the differential amplifier 150, is equalized to the voltage that is input to the other input terminal of the differential amplifier 150 and that is output from the current-to-voltage converter 140.

Figure 5:
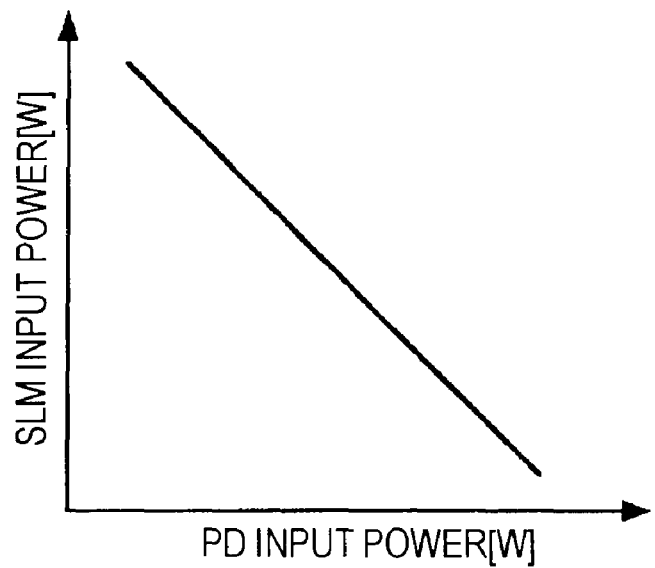
FIG. 5 is a graph showing the relationship between spatial light modulator input power and photo detector input power.

In the APC processing according to the first embodiment, an object to be eventually controlled is the amount of a light beam incident on the spatial light modulator 19. However, it is difficult to detect the amount of the light beam incident on the spatial light modulator 19. For this reason, the amount of a light beam that enters the photo detector 53, which is strongly associated with the amount of the light beam incident on the spatial light modulator 19, is controlled. FIG. 5 is a graph showing the relationship between spatial light modulator input power (SLM input power), which is power of the light beam incident on the spatial light modulator 19, and photo detector input power (PD input power), which is power of the light beam that enters the photo detector 53. The vertical axis of FIG. 5 indicates the spatial light modulator input power, and the horizontal axis indicates the photo detector input power. As it is clear from the diagram showing the optical path, the sum of the spatial light modulator input power and the photo detector input power is equal to power of a light beam that enters the polarizing beam splitter 20. When the power of the light beam that enters the polarizing beam splitter 20 is constant, the sum of the spatial light modulator input power and the photo detector input power becomes constant. In other words, when the amount of the light beam incident on the spatial light modulator 19, which is the object to be controlled, increases, the photo detector input power decreases. When the amount of the light beam incident on the spatial light modulator 19, which is the object to be controlled, decreases, the photo detector input power increases. In contrast, in a recording/reproducing apparatus for a CD in the related art, the relationship between a light beam power that is an object to be controlled and the amount of a light beam that enters a monitor photo detector (PD) is as follows: When the light beam power, which is the object to be controlled, increases, the amount of the light beam that enters the monitor PD also increases; and When the light beam power, which is the object to be controlled, decreases, the amount of the light beam that enters the monitor PD also decreases. This relationship is different from that in the first embodiment.

Figure 6:
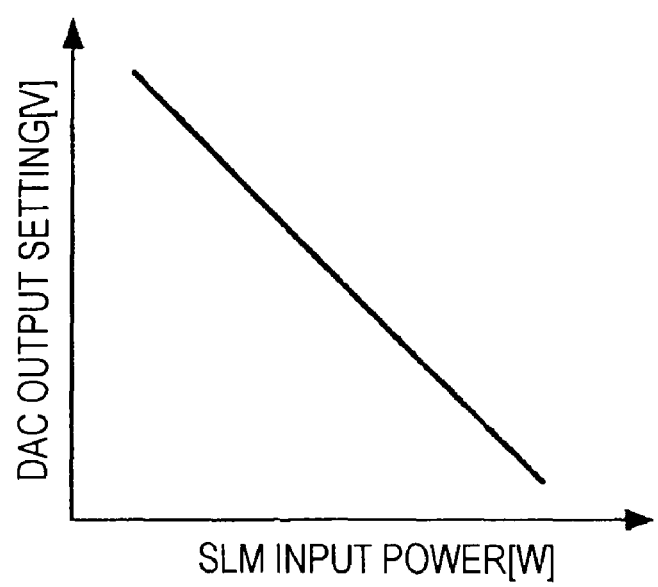
FIG. 6 is a graph showing the relationship between analog signal output from a digital-to-analog converter and the amount of a light beam incident on a spatial light modulator.

Accordingly, a voltage represented using the digital signal that is output from the central processing unit 120, i.e., a voltage of the analog signal output from the digital-to-analog converter 130, is set to be lower when the amount of the light beam on the spatial light modulator 19 is desired to be increased. In contrast, when the amount of the light beam on the spatial light modulator 19 is desired to be decreased, the voltage of the analog signal output from the digital-to-analog converter 130 is set to be higher. FIG. 6 is a graph showing the relationship between the analog signal output from the digital-to-analog converter 130 and the amount of the light beam incident on the spatial light modulator 19. In this case, the upper threshold of the amount of the light beam incident on the spatial light modulator 19 and an adjustment range of the amount of the light beam incident on the spatial light modulator 19 are determined from the amount of a light beam emitted from the external-cavity light source 10. Accordingly, in order that a desired adjustment range is set within the range of the beam power of the light beam emitted from the external-cavity light source 10, it is necessary that an injection current that is injected to the external-cavity light source 10 be controlled in advance.

Figure 7:
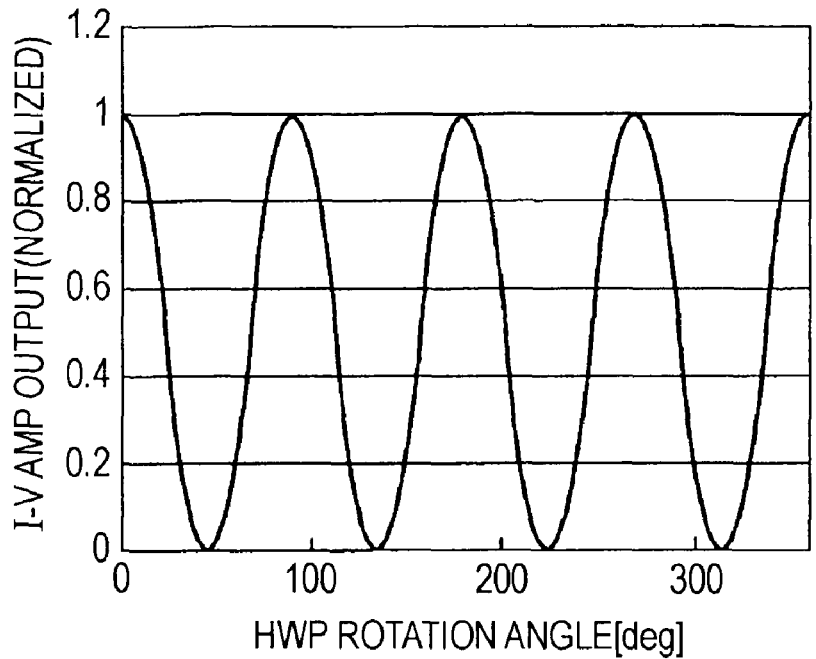
FIG. 7 is a graph showing the relationship between rotation angle of a half wave plate and voltage output from a current-to-voltage converter.

FIG. 7 is a graph showing the relationship between the rotation angle of the half wave plate 57 and the voltage output from the current-to-voltage converter 140. First, the optic axis of the half wave plate 57 is adjusted so that the light beam which enters the photo detector 53 can be p-polarized (the amount of the light beam incident on the spatial light modulator 19 is set to zero). In this case, the rotation angle of the half wave plate 57 is defined as 0°. The rotation angle of the half wave plate 57 is represented as +θ°. The rotation direction can be represented in the same manner for both a clockwise direction and a counterclockwise direction. With respect to a plane onto which the light beam is incident, a rotation angle in the clockwise direction is defined as +θ°, and a rotation angle in the counterclockwise direction is defined as −θ°. A polarization angle of an outgoing light beam that leaves the half wave plate 57 is changed by 2θ°, which is twice θ°. Because the voltage output from the current-to-voltage converter 140 indicates the integral value of light intensity, the value of the voltage can be expressed as sin 2θ. In other words, the rotation angle of the half wave plate 57 has a period of 45°, and in the period of 45°, the amount of the light beam that enters the photo detector 53 is changed from the maximum amount to the minimum amount (the amount of the light beam is zero). The voltage output from the current-to-voltage converter 140 is also changed in unit ranges of 45° as in the case of the amount of the light beam that enters the photo detector 53.

Figure 8:
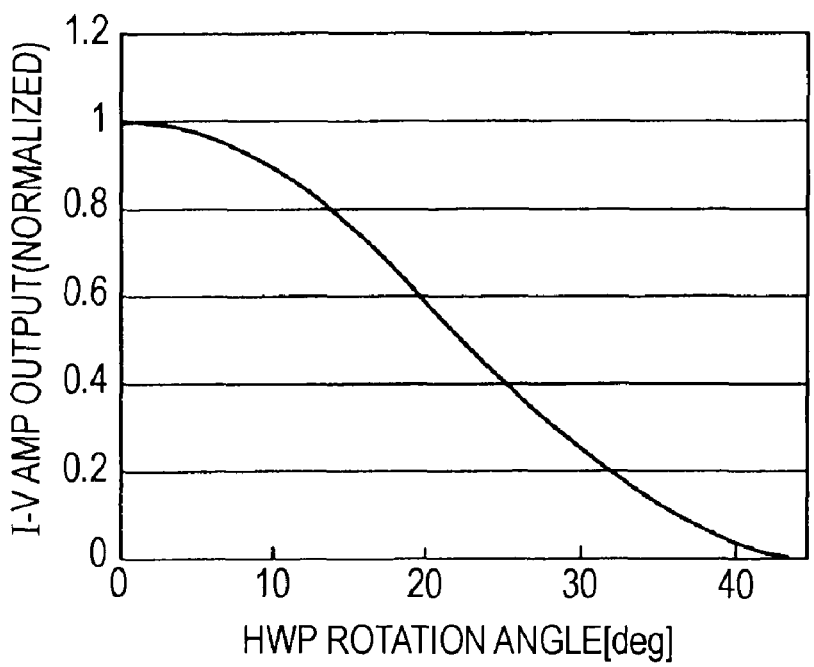
FIG. 8 is a graph showing the voltage output from the current-to-voltage converter when the rotation angle of the half wave plate ranges from 0° to 45°.

FIG. 8 is a graph showing the voltage output from the current-to-voltage converter 140 when the rotation angle of the half wave plate 57 ranges from 0° to 45°. As shown in FIG. 8, when a range from the maximum amount of the light beam to the minimum amount of the light beam is set as an adjustment range of the APC, the rotation angle of the half wave plate 57 ranges, for example, from 0° to 45°.

Figure 9:
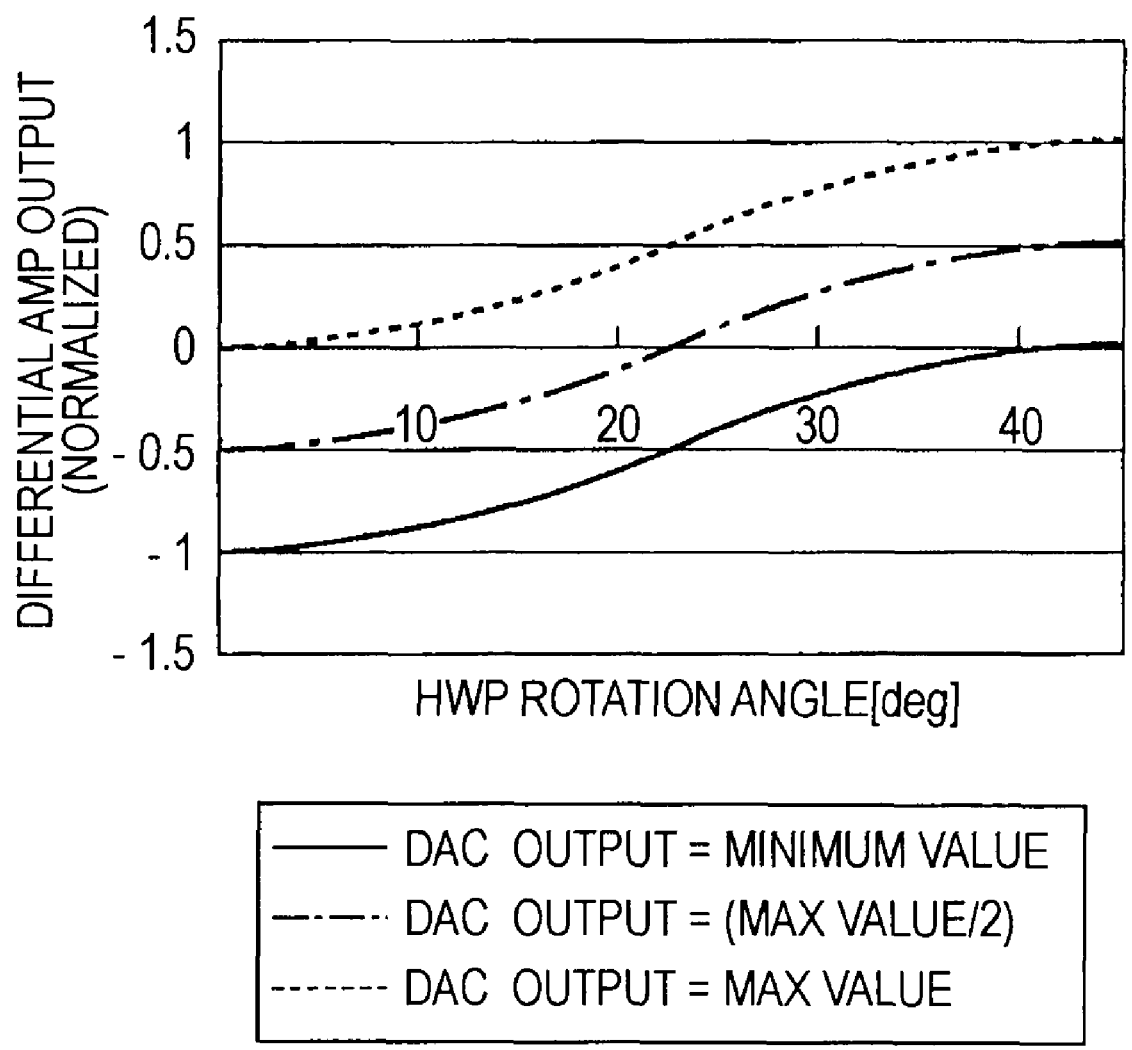
FIG. 9 is a graph showing the relationships between the rotation angle of the half wave plate and voltage output from a differential amplifier.

FIG. 9 is a graph showing the relationships between the rotation angle of the half wave plate 57 and the voltage output from the differential amplifier 150 for the minimum, medium, and maximum values of the voltage of the analog signal output from the analog-to-digital converter 130. In FIG. 9, the solid line, the alternate long and short dashed line, and the dashed line represent the relationships for the minimum, medium (the medium value is half the maximum value), and maximum values of the voltage of the analog signal output from the analog-to-digital converter 130, respectively.

As it is clear from FIG. 9, the rotation angle of the half wave plate 57 in a case in which the voltage (the error voltage) output from the differential amplifier 150 becomes zero changes in accordance with the voltage (the reference voltage) of the analog signal output from the analog-to-digital converter 130. The rotation angle of the half wave plate 57 is set in advance so that the rotation angle of the half wave plate 57 becomes 45° in a case in which the reference voltage is the minimum value, so that the rotation angle of the half wave plate 57 becomes 22.5° in a case in which the reference voltage is the medium value, and so that the rotation angle of the half wave plate 57 becomes 0° in a case in which the reference voltage is the maximum value. When the negative feedback loop functions without a stationary error, an APC system functions so that the error voltage can be made zero. In this manner, the rotation angle of the half wave plate 57 is accurately positioned so that the amount of the light beam that enters the photo detector 53 can be set to a predetermined value in correspondence with the reference voltage. In this embodiment, the object to be eventually controlled is the amount of the light beam incident on the spatial light modulator 19. Accordingly, when the relationship between the amount of the light beam incident on the spatial light modulator 19 and the amount of the light beam that enters the photo detector 53, and the relationship between the amount of the light beam incident on the spatial light modulator 19 and the digital signal output to the digital-to-analog converter 130 are stored in advance in a storage unit such as a random-access memory (PAM) that is disposed in the central processing unit 120, the amount of the light beam incident on the spatial light modulator 19 can be easily set to a desired value in correspondence with the reference voltage.

As described with reference to FIG. 7, for the voltage output from the current-to-voltage converter 140, the rotation angle of the half wave plate 57 has a plurality of angular ranges (four angular ranges included in a range from 0° to 360°). Negative feedback and positive feedback are alternately switched in the APC loop every time the rotation angle of the half wave plate 57 is changed by 45°. Accordingly, in a case in which no limitation is imposed on the rotation angle of the half wave plate 57, when the APC processing is suddenly performed, there is a probability that the APC loop does not function as the negative feedback loop. For this reason, for example, the APC loop is controlled by the APC system as follows (a pull-in operation of the APC is performed as follows): The rotation angle of the half wave plate 57 is set to zero as an initialization value; A desired digital signal (a desired reference voltage) is output to the digital-to-analog converter 130; and The half wave plate 57 is rotated in the clockwise direction with respect to the light-incidence plane of the half wave plate 57 until the voltage (the error voltage) output form the differential amplifier 150 becomes zero. In this manner, the APC system can operate as a negative feedback control system so that the half wave plate 57 can be rotated in the counterclockwise direction in a case in which the voltage (the error voltage) output from the differential amplifier 150 becomes a positive value, and so that the half wave plate 57 can be rotated in the clockwise direction in a case in which the voltage output from the differential amplifier 150 becomes a negative value.

In this method, in a case in which the entire range from 0° to 45° is used for the rotation angle of the half wave plate 57, there is a probability that the APC system suddenly shifts from the negative feedback control system to a positive feedback control system at the boundaries of 0° and 45°, resulting in oscillation of the APC system. For this reason, it is preferable that the rotation angle of the half wave plate 57 not be set in the vicinity of 0° or 45°. In other words, it is preferable that the sufficient beam power of the light beam obtained by the external-cavity light source 10 be ensured, and that the rotation angle of the half wave plate 57 not be set in the vicinity of 45°. When the rotation angle of the half wave plate 57 is set in the vicinity of 0°, it is preferable that the shutter 54 be operated so that the amount of a light beam applied to the hologram-recording medium can be made zero. In other words, it is preferable that the half wave plate 57 be rotated to prevent the amount of the light beam incident on the spatial light modulator 19 from becoming zero.

In a case in which there are fluctuations in intensity of the beam power of the light beam obtained by the external-cavity light source 10 (fluctuations in intensity of the amount of the light beam), setting the rotation angle of the half wave plate 57 in the vicinity of 0° or 45° is not preferable because the setting does not have an adjustment margin. The adjustment margin is the margin of an adjustment range in which the APC system can operate as the negative feedback control system even in a case of misadjustment. For example, when the intensity fluctuations of the beam power of the light beam falls within ±5% of the range of the intensity of the beam power, in view of ensuring of the adjustment margin, it is preferable that a range from 10% to 90% of the range from the maximum voltage value to the minimum voltage value of the current-to-voltage converter 140 be used as the adjustment range of the APC. In this case, it is preferable that the analog signal output from the digital-to-analog converter 130 range from 10% to 90% of the dynamic range. In other words, it is preferable that the rotation angle of the half wave plate 57 range from 4.5° to 40.5°.

As another method for ensuring that the APC system functions as the negative feedback control system, the range of the rotation angle of the half wave plate 57 may be limited to, for example, any of angular ranges of 45°, i.e., any of a range from 0° to 45°, a range from 90° to 135°, a range from 180° to 225°, and a range from 270° to 315°. As a mechanism that limits the rotation range of the half wave plate 57, a mechanism may be employed, in which a mechanical stopper is provided in the half wave plate 57 in order to limit the rotation angle of the half wave plate 57. Alternatively, a mechanism may be employed, in which a mechanical stopper is provided in the motor 51 in order to limit the rotation angle of the half wave plate 57. Additionally, when the above-described adjustment margin is considered, it is most preferable that the rotation angle of the half wave plate 57 range from 4.5° to 40.5° instead of ranging from 0° to 45°. Regarding the other angular ranges, it is most preferable that the rotation angle of the half wave plate 57 range from 10% to 90% of the other angular ranges.

Furthermore, in the hologram recording/reproducing apparatus 2 shown in FIG. 3, even when the position relationship between the spatial light modulator 19, and the condenser lens 52 and the photo detector 53 is relatively changed, the same function can be achieved. In this case, the range of the rotation angle of the half wave plate 57 is limited to, for example, any of angular ranges of 45°, i.e., any of a range from 45° to 90°, a range from 135° to 180°, a range from 225° to 270°, and a range from 315° to 360°. Alternatively, the contents of a table that is stored in the RAM may be rewritten to limit the range of the rotation angle of the half wave plate 57 to, for example, any of angular ranges of 45°, i.e., any of a range from 0° to 45°, a range from 90° to 135°, a range from 180° to 225°, and a range from 270° to 315°.

The description given above is made on the assumption that the beam power of the light beam emitted from the external-cavity light source 10 is not changeable. In a case in which the beam power of the light beam emitted from the external-cavity light source 10 is changeable, when the APC is performed, an appropriate setting range of the digital signal output to the digital-to-analog converter 130 is determined on a case-by-case basis. In this manner, a range over which the beam power of a light beam is changeable can be widely changed within the range of the beam power of the light beam emitted from the external-cavity light source 10.

In the first embodiment described above, timing at which the shutter 54 is opened and closed is controlled by a control system that controls the shutter 54, whereby the exposure time of a light beam for the hologram-recording medium is adjusted. As described in detail, the amount of the light beam for the hologram-recording medium is controlled by the APC system. Because both the control system that controls the shutter 54 and the APC system are independent from each other, the control and stabilization of the light beam can be easily realized using the central processing unit 120 having a typical processing speed, without using a device having an excellent frequency response. Additionally, regarding the accuracy of control of the rotation angle of the half wave plate 57, in a case in which a normally available stepping motor is used as the motor 51 and in which a normally available ten-bit D/A converter is used as the digital-to-analog converter 130, an accuracy of about nine bits can be obtained as the accuracy of the rotation angle. A resolution can be also obtained, with which a range of 45° over which the rotation angle is changeable is resolved into 512 pieces. As described above, in the RAM disposed in the central processing unit 120, a table may be stored, in which the relationship between the beam power of the light beam incident on the spatial light modulator 19 and the value of the digital signal output to the digital-to-analog converter 130 is shown. By using the table, the accurate APC can be realized, in which the beam power of the light beam incident on the spatial light modulator 19, i.e., eventually, the beam power of a light beam used to record/reproduce data in the hologram-recording medium, is easily, accurately, and stably controlled.

In the hologram recording/reproducing apparatus 2 in which a light-beam-emitting unit having the APC system is embedded, a temperature sensor 60, which includes, for example, a thermistor, may be disposed in the vicinity of the hologram-recording medium. A signal acquired by the temperature sensor 60 is detected by the central processing unit 120, and the digital signal output to the digital-to-analog converter 130 is set on the basis of a temperature represented using the signal. By using the temperature sensor 60 in this manner, a light beam whose amount is the most appropriate for the recording sensitivity of the hologram-recording layers, which changes due to temperature fluctuations of the hologram-recording medium, can be applied to the hologram-recording medium. In other words, in addition to control performed on the basis of the amount of the light beam detected by the photo detector 53, a control operation is performed, in which the polarization angle of the light beam that is determined by the half wave plate 57 is changed on the basis of a temperature detected by the temperature sensor 60. Accordingly, a light beam whose amount is the most appropriate for the temperature of the hologram-recoding medium can be applied to the hologram-recording medium. More specifically, the control operation can be performed as follows: A signal detected by the photo detector 53 is input to one input terminal of the differential amplifier 150, whereby an operation of stabilizing the beam power of a light beam is performed using the negative feedback loop based on the amount of the light beam; In addition to the stabilization operation of the beam power of the beam light, the digital signal is set on the basis of the temperature detected by the temperature sensor 60, and is output to the digital-to-analog converter 130; and the analog signal output from the digitalto-analog converter 130 is input as the reference voltage to the other input terminal of the differential amplifier 150. The relationship between the temperature and the reference voltage is stored in advance as a table in the RAM disposed in the control unit 100. The temperature sensitivity of the hologram-recoding medium is measured, and this table is determined using a result of the measurement of the temperature sensitivity.

In the above-described embodiment, the hologram recording/reproducing apparatus has been described, in which the light-beam-emitting unit having the APC system is embedded. The light-beam-emitting unit having the APC system can be not only used for a technique for recording/reproducing a hologram but also independently used for other applications. In other words, the light-beam-emitting unit having the APC system can be used for any application in which laser light is produced by oscillation in a single mode and in which the beam power of a light beam is changed. In this case, when a function of modulating a light beam in the spatial light modulator 19 is not necessary, all of the pixels of the spatial light modulator 19 are set to "1". Additionally, instead of using the spatial light modulator 19, a typical mirror can be used, whereby the hologram recording/reproducing apparatus can have a simpler configuration. Furthermore, instead of using either the spatial light modulator 19 or the mirror, the light beam can be emitted at a predetermined intensity in a direction of an open plane (referring to FIG. 3, a direction in which the spatial light modulator 19 is disposed, and in which an open state is set by removing the spatial light modulator 19).

When only the light-beam-emitting unit is independently used, from among the optical components shown in FIG. 2, only the following optical components are necessary: the external-cavity light source 10; the isolator 55, the beam expander/pinhole 12 including the Fourier transform lens 13, the pinhole 14, and the Fourier transform lens 15; the mirror 16; the half wave plate 57; the spatial light modulator 19; the polarizing beam splitter 20; the condenser lens 52; and the photo detector 53. A shaping operation is performed on a light beam that leaves the polarizing beam splitter 20, and the shaped light beam can be used for various types of applications. In this case, the motor 51 may be provided as a mechanical unit, and a control unit may be provided, which performs a control operation similar to that performed by the control unit 110. The beam power of the light beam that leaves the polarizing beam splitter 20 can be freely changed, and the wavelength of the light beam can be freely changed. Furthermore, for example, a shutter similar to the shutter 54 may be provided. The pinhole 14, the condenser lens 52, or the spatial light modulator 19 is not necessarily used. Instead of the spatial light modulator 19, a mirror may be used. Accordingly, various types of modifications can be employed for the applications.

Second Embodiment

Figure 10:
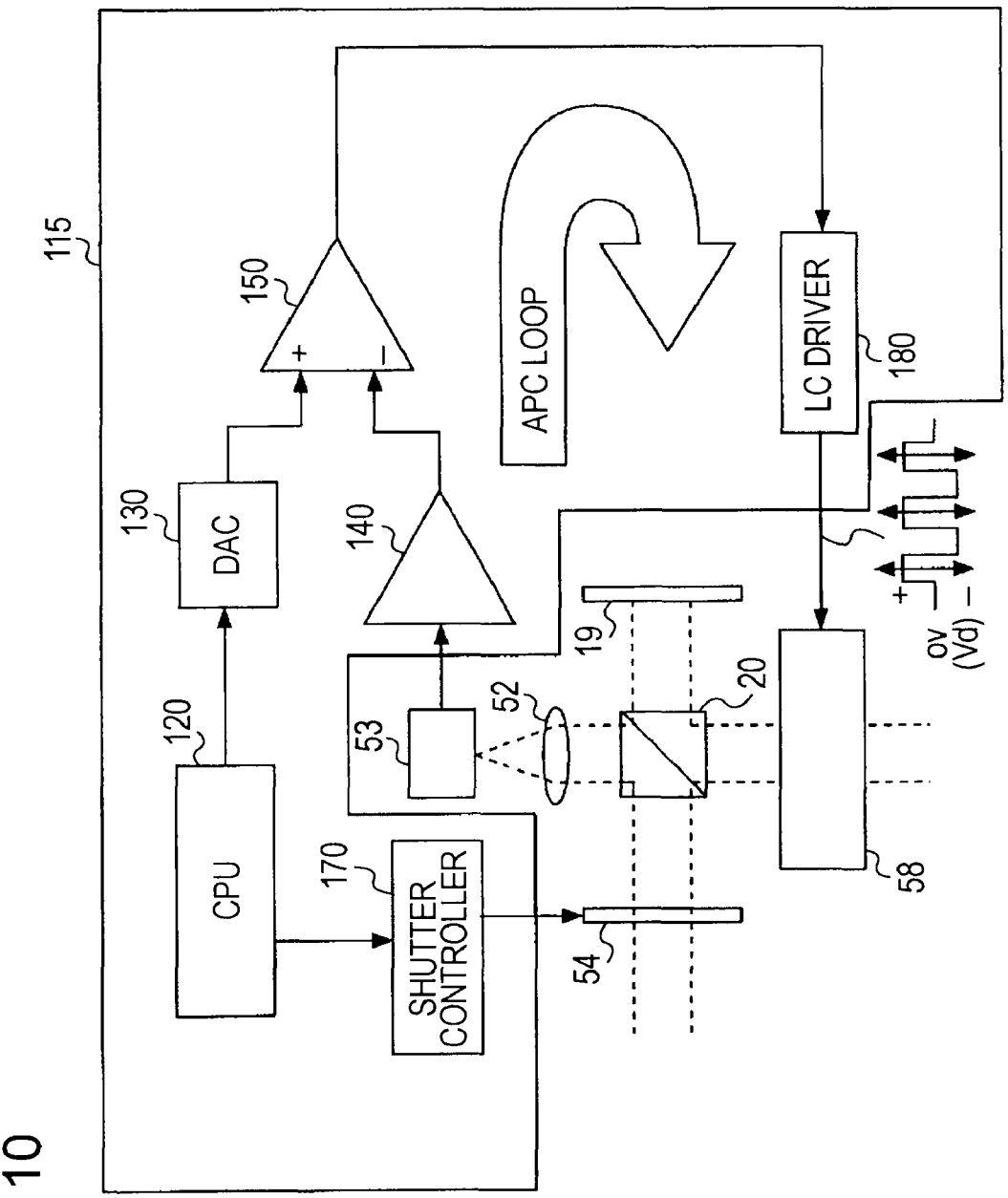
FIG. 10 is a schematic diagram of an APC processing unit according to a second embodiment.

FIG. 10 is a schematic diagram of an APC unit that serves as the main unit of a hologram recording/reproducing apparatus according to a second embodiment. FIG. 10 corresponds to FIG. 4 used to describe the first embodiment. Regarding components shown in FIG. 10, components identical with those shown in FIG. 4 are designated by the same reference symbols, and the description thereof is omitted. The second embodiment is a modification of the first embodiment. The most difference between the first and second embodiments is that a unit configured using the half wave plate 57 and the motor 51 in the first embodiment is replaced with a liquid crystal (LC) device 58 in the second embodiment. Because the liquid crystal device 58 is used, the motor driver 160 of the control unit 110a in the first embodiment is replaced with an LC driver 180 of a control unit 115 in the second embodiment.

The hologram recording/reproducing apparatus according to the second embodiment operates on a basic principle similar to that in the case of the hologram recording/reproducing apparatus according to the first embodiment. The description of the basic principal is omitted. The liquid crystal device 58 and the LC driver 180 are mainly described below. In the second embodiment, instead of adjusting the light-incident polarization angle of the light beam that enters the polarizing beam splitter 20 using a combination of the half wave plate 57 and the motor 51, molecular orientation of a liquid crystal of the liquid crystal device 58 is controlled. By controlling the molecular orientation of the liquid crystal, a polarization state of the light-incident polarization of the light beam that enters the polarizing beam splitter 20 is adjusted so that the light-incident polarization can become linear polarization, elliptic polarization, or circular polarization. In the second embodiment, the liquid crystal device 58 uses a vertically oriented liquid crystal that is generally applied to a liquid crystal display. The light beam is caused to enter the liquid crystal device 58 at a polarization angle that is changed by 45° from an axis of liquid crystal molecules. An output voltage Vd is output from the LC driver 180, and the waveform of the output voltage Vd is a square wave shown in FIG. 10. An amplitude of the square wave that is a waveform of the output voltage Vd is adjusted, whereby the molecular orientation of the liquid crystal can be controlled so that any molecular orientation can be set as the molecular orientation. As a result, the polarization state of the light beam can be controlled. In the first embodiment, the direction of the linear polarization of the light beam can be controlled by rotating the half wave plate configured as the polarization control element. In contrast, in the liquid crystal device 58 employed in the second embodiment, the polarization state of the light beam can be controlled so that the polarization state can become a linear polarization state, an elliptic polarization state, or a circular polarization state. The first and second embodiments are different in the above-described respect. However, the first and second embodiments are not different in the basic principal that is used in a process that is performed after the light beam is split by the polarizing beam splitter 20. In this manner, as in the case of the first embodiment, also in the second embodiment, an APC loop serving as the negative feedback control system can be configured.

Figure 11:
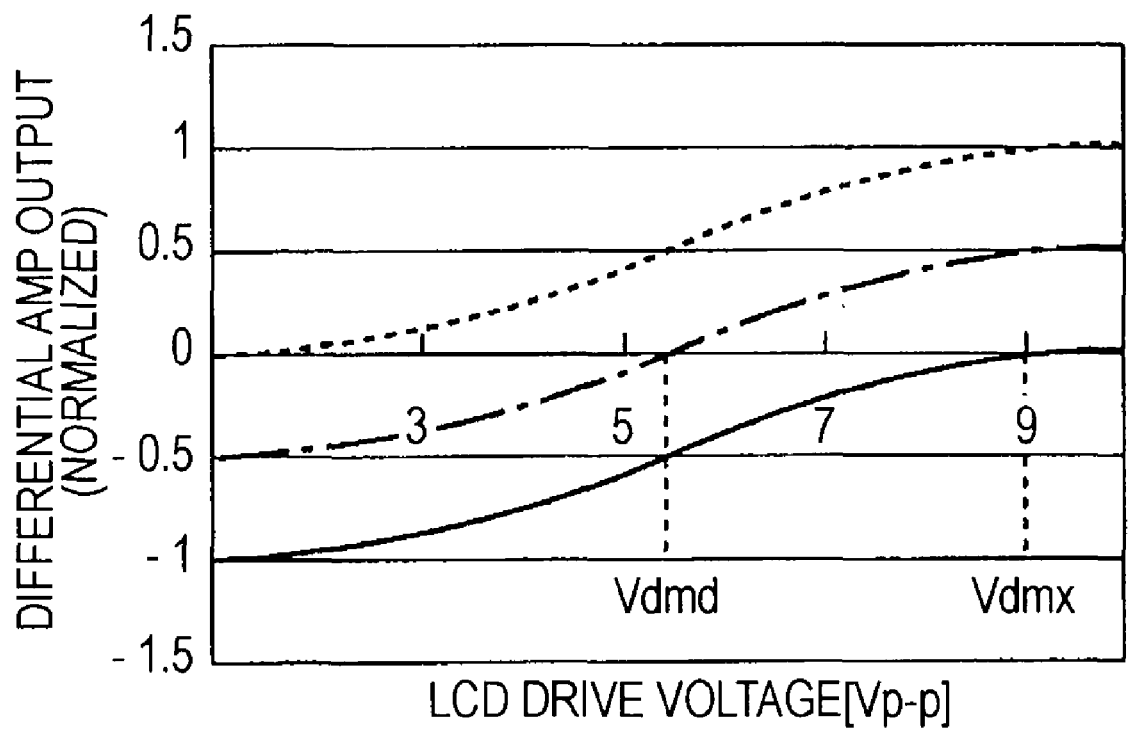
FIG. 11 is a graph showing the relationships between liquid-crystal drive voltage according to the second embodiment and the voltage output from the differential amplifier.

FIG. 11 is a graph showing the relationships between the output voltage Vd (Vp–p), which is an LCD drive voltage output from the LC driver 180, and the voltage output from the differential amplifier 150 for the minimum, medium, and maximum values of the voltage of the analog signal output from the analog-to-digital converter 130. In FIG. 11, the solid line, the alternate long and short dashed line, and the dashed line represent the relationships for the minimum, medium (the medium value is half the maximum value), and maximum values of the voltage of the analog signal output from the analog-to-digital converter 130, respectively.

As it is clear from FIG. 11, the LCD drive voltage in a case in which the voltage (the error voltage) output from the differential amplifier 150 becomes zero changes in accordance with the voltage (the reference voltage) of the analog signal output from the analog-to-digital converter 130. The LCD drive voltage is set in advance so as to become Vdmx in a case in which the reference voltage is the minimum value, so as to become Vdmd in a case in which the reference voltage is the medium value, and so as to become zero voltage in a case in which the reference voltage is the maximum value. In this manner, by setting the reference voltage to a predetermined value, the amount of the light beam that enters the photo detector 53 can be set to a predetermined value. Accordingly, when the relationship between the amount of the light beam incident on the spatial light modulator 19 and the digital signal (the reference voltage) output to the digital-to-analog converter 130 is stored in advance in the storage unit such as the RAM that is disposed in the central processing unit 120, the amount of the light beam incident on the spatial light modulator 19 can be easily set to a desired value.

In this case, as in the case of the first embodiment, it is desirable that a range over which the LCD drive voltage can be changed be determined in consideration of the intensity fluctuations of the beam power of the light beam emitted from the external-cavity light source 10. Additionally, in a case in which the beam power of the light beam emitted from the external-cavity light source 10 is changeable, when the APC is performed, it is preferable that an appropriate value of the digital signal be set for each case, as in the case of the first embodiment.

In the second embodiment, all of the advantages that can be obtained in the first embodiment can be obtained. In addition to the advantages, in the second embodiment, because no mechanical control such as control of rotating the half wave plate is performed, the hologram recording/reproducing apparatus can have a simpler configuration, and vibration that occurs in a case in which the motor is used does not occur. Accordingly, no scheme to remove the vibration is necessary, and the size of the hologram recording/reproducing apparatus can be reduced.

According to the above-described embodiments, the amount of the light beam incident on the hologram-recording medium can be controlled so as to become a predetermined amount, and can be accurately stabilized as a certain amount. Accordingly, recording/reproducing characteristics in a case in which a hologram is recorded/reproduced can be improved using any of the hologram recording/reproducing apparatuses according to the embodiments. More specifically, for example, the temperature sensor is disposed in the vicinity of the hologram-recording medium, and a control operation is performed, in which the amount of the light beam that is to be applied to the hologram-recording medium is appropriately set on the basis of the temperature detected by the temperature sensor. Although the recording sensitivity of the hologram-recording medium is fluctuated due to temperature, the fluctuations can be compensated by the controlling the amount of the light beam.

According to the above-described embodiments, a light source can be provided, which generates a light beam in a single mode, and which can change the beam power of the light beam. The demand for the light source is not only for use in hologram recording/reproducing apparatuses. In the future, the demand for the light source will increase. A large amount of industrially useful equipment in which the light source is used can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram recording/reproducing apparatus that records data as a hologram by applying a signal light beam and a reference light beam to a hologram-recording medium, that obtains a diffracted light beam by applying a reproduction light beam to the hologram recorded in the hologram-recording medium, and that reproduces the recorded data using the diffracted light beam, the hologram recording/reproducing apparatus comprising:
   an external-cavity light source;
   a polarization-control element configured to change a polarization angle of a light beam emitted from the external-cavity light source;
   a polarizing-beam-splitting element configured to split the light beam polarized by the polarization-control element in two directions to obtain two light beams, and configured to change a ratio between amounts of the two light beams on the basis of the polarization angle of the light beam that is determined by the polarization-control element or on the basis of a polarization state of the light beam that is determined by the polarization-control element;
   a photoreceptor configured to receive one of the two light beams obtained by splitting the light beam in the two directions;
   a spatial light modulator configured to receive the other of the two light beams obtained by splitting the light beam in the two directions, and configured to generate a signal light beam, a reference light beam, and a reproduction light beam; and
   a control unit configured to perform a control operation of changing, on the basis of a light amount detected by the photoreceptor, the polarization angle or polarization state of the light beam that is determined by the polarization-control element.

2. The hologram recording/reproducing apparatus according to claim 1, wherein the polarization-control element includes a half wave plate and a motor configured to rotate the half wave plate.

3. The hologram recording/reproducing apparatus according to claim 2, wherein the motor is a stepping motor.

4. The hologram recording/reproducing apparatus according to claim 1, wherein the polarization-control element is a liquid-crystal device.

5. The hologram recording/reproducing apparatus according to claim 1, further comprising a shutter configured to control whether the light beam is allowed to pass or is stopped, wherein the control unit controls an exposure time for which the signal light beam and the reference light beam are applied to the hologram-recording medium.

6. The hologram recording/reproducing apparatus according to claim 1, further comprising a temperature sensor configured to detect a temperature of the hologram-recording medium, wherein, in addition to the control operation performed on the basis of the light amount detected by the photoreceptor, the control unit performs a control operation of changing, on the basis of the temperature detected by the temperature sensor, the polarization angle or polarization state of the light beam that is determined by the polarization-control element.

* * * * *